3,405,525
HYDRAULIC BRAKE SYSTEM
Edward M. Thomas, 29 Drumgoole Blvd.,
Staten Island, N.Y. 10312
Filed Jan. 21, 1966, Ser. No. 522,196
4 Claims. (Cl. 60—54.6)

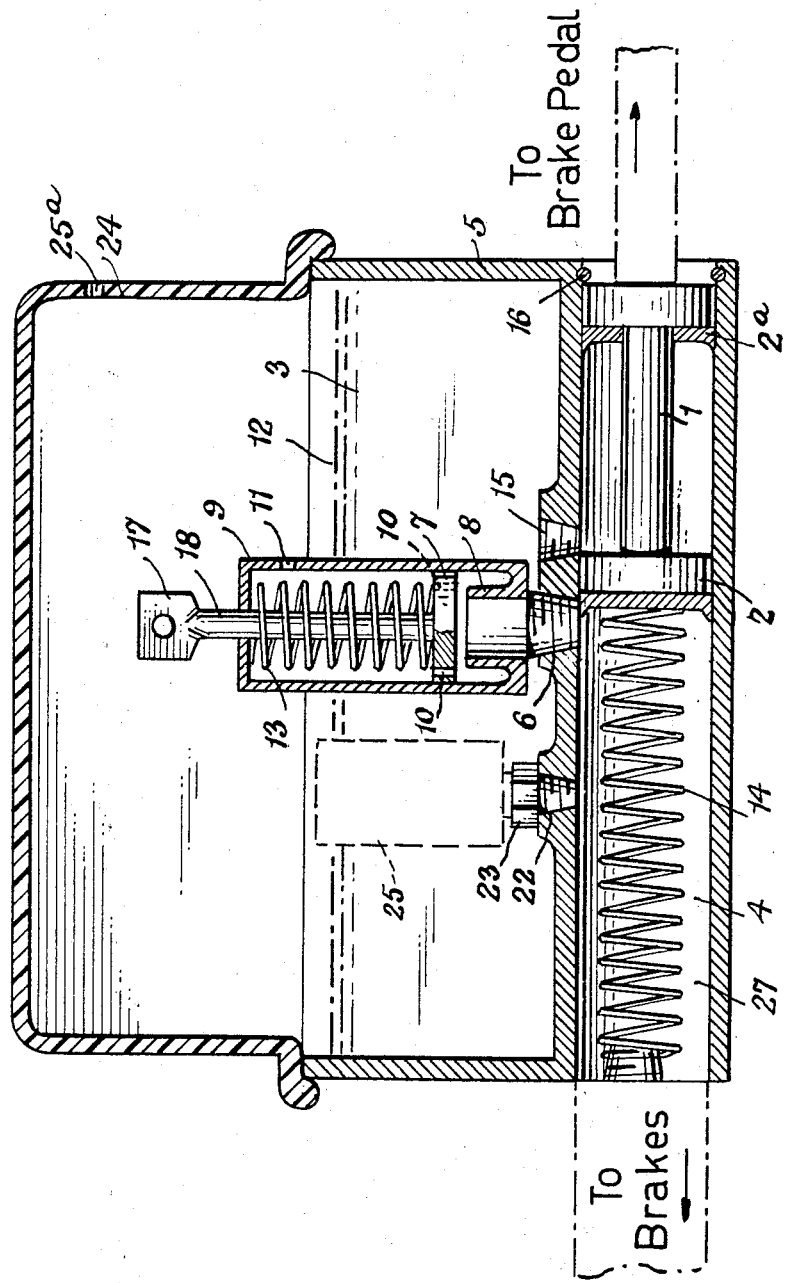

ABSTRACT OF THE DISCLOSURE

A hydraulic brake system particularly adapted for automotive vehicles and which includes a valve assembly inserted in the system which serves to maintain a required residual fluid pressure uniformly in the brake system including the master cylinder bore when the brake pedal is in a released position. The arrangement includes means by which a reduction in or decrease of residual pressure is detectable so that the deficiency in the brake system can be corrected.

---

This invention relates to hydraulic brake systems and especially those which are particularly adapted for automotive vehicles, and the invention has special reference to means by which residual hydraulic pressure will be maintained uniformly in the brake system and especially while the brake pedal is in a released position.

The present invention contemplates the provision of an assembly which includes a spring-loaded valve and a test handle or stem that will be indexed with a compensating port to maintain the required 8 to 12 lbs. pressure in the body of the master cylinder of the brake system as well as in the lines and wheel cylinders when the brake pedal is in its released position. Such a replaceable assembly, having a single and positive valve action, would replace the conventional main spring and check valve normally incorporated in the bore of single and dual master cylinders.

A device made according to the present invention provides, through its single valve action, a means which is not as delicate as the present-day check valve which serves to rather ineffectively maintain residual fluid pressure. A feature of the present device is that the same can be fitted on or replaced without disturbance of the master cylinder, this result being obtained by the simple removal of the cover of the master cylinder housing; the unscrewing of the assembly and the installation of the new unit.

By the use of the described structure, the primary cup in the master cylinder is subjected to residual fluid pressure in order to insure the maintenance of cup tension against the inner wall surface of the master cylinder. There is incorporated in the device, an easily accessible element or test valve handle or stem which, when raised, in conjunction with a residual pressure switch, and which switch can be of the construction disclosed in detail in my co-pending patent application Serial No. 488,065, would serve as a test to ascertain the proper or correct functioning of such switch to indicate a reduction in or decrease of residual pressure in the brake system. When no residual pressure switch is employed, the presence of required residual pressure in the system is indicated to the mechanic by a discharge of brake fluid through a specifically located vent hole when the test handle or stem assumes an elevated position.

With these and other objects to be hereinafter set forth in view, I have devised the arrangement of parts to be described and more particularly pointed out in the claims appended hereto.

In the accompanying drawing, wherein an illustrative embodiment of the invention is disclosed, the figure shown is a vertical sectional view of a device constructed in accordance with the invention.

Referring to the drawing, 1 indicates the piston of the brake unit, the piston having a forward or primary cup indicated at 2 and which, when the piston is moved by the depression of the brake pedal, forces the hydraulic fluid shown in the reservoir at 3 and also contained in the bore 4 of the master cylinder housing 5, up through the compensating port 6. As the fluid is forced up through the port 6 it reaches and raises the valve shown at 7 from its seat 8 provided within a housing 9 threadably mounted in the port 6.

The casing shown at 5 includes an upper reservoir containing the hydraulic fluid 3 and said casing is formed in its lower portion with the master cylinder 27. The casing 5 is closed at the top by a removable cover member 24, which may be composed of a transparent plastic material for visibility and provided with a breather hole indicated at 25a.

The valve 7 is provided with a port 10 through which the hydraulic fluid flows to thus pass the valve 7 and reach and flow through the port 11 provided in the upper portion of the side wall of the housing 9, the fluid flowing out of the port 11 and returning to the interior of the housing 5, the normal fluid level in the housing being indicated at 12.

As the piston continues its movement in the bore 4 and toward the left to apply the brakes, the cup 2 passes the port 6 and the flow of fluid up through the port 6 is discontinued, whereupon the valve-biasing spring 13, contained within the housing 9 and operative on the valve 7, becomes effective to seat the valve against its seat 8.

As the pressure on the brake pedal is released, the piston and its attached cups 2 and 2a is returned under the pressure of its spring 14, obtaining fluid through the breather port 15 past the primary cup lips. When the piston reaches the end of its return movement and reaches the stop ring 16, the brake shoe springs are forcing the fluid out of the wheel cylinders and back to the compensating port 6 then closed by the valve 7 under the pressure of the spring 13 which exerts a pressure of from 8 to 12 lbs. The force exerted by the brake shoe springs is sufficient to overcome the bias of the spring 13 on the valve 7 and hence the pressure of the fluid will unseat or raise the valve 7 and the fluid will flow through the port 10, through the housing 9 and out through the port 11 to enter the supply 3. The flow of the fluid as above described is continued until the pressure of the same reduces to from 8 to 12 lbs. whereupon the spring 13 becomes effective to seat the valve 7, maintaining the desired residual fluid pressure throughout the system, including the forward portion of the master cylinder 27.

It will be noted that the valve 7 is formed with an extended test handle or stem 18 having a part 17 located externally of the housing 9 and if desired, said handle or stem can be coupled to a residual pressure switch such as disclosed in my said co-pending application Ser. No. 488,065, and by which a visual or audible signal can thereby be actuated, as discussed in said application, to indicate to the car operator a lowering of the residual pressure.

If desired, a third vent, indicated at 22, and shown as being closed by a plug 23, can establish communication between the reservoir in the housing 5 and the interior of the cylinder 27, and this vent 22 can accept a threaded residual pressure switch indicated at 25 as an optional accessory. If the third port, or that indicated at 22, is located approximately one-third of the distance from the port 6 to the maximum stroke of the cup 2 on the piston 1 when the piston goes past the residual pressure switch 25, indicating a need for brake shoe adjustment, the pressure in the switch at 8 to 12 lbs. would be vented past the cup 2 and would discharge back through the breather port 15. When the residual pressure switch is thus vented it will actuate a warning system to which it can be connected, to warn the car operator that there is need to adjust or regulate the brake system, and in addition, the switch will serve to detect a loss of residual pressure due to leakage in the hydraulic system.

The port 22 and the residual pressure switch can also be located so that its distance from the breather port 15 is less than the distance from the piston cup 2 and the cup 2a to thereby provide for access between the ports 22 and 15 when the cup 2 has moved past the port 22. All of the ports namely, 6, 15 and 22, can have their upper ends located above the reservoir floor to provide a sump for the collection of foreign matter.

In hydraulic brake construction it has often been erroneously assumed that the maintenance of residual hydraulic pressure is relatively permanent and as a result the average mechanic, when disassembling a master cylinder generally does not replace the usual check valve since he has no means of measuring its holding ability in pounds of pressure. Thus, since no complaint was made by the car operator in regard to his brakes, the check valve is generally ignored, and instead, leaking wheel cylinders have their cups replaced.

Sensitive switches, such as that described in said patent application Ser. No. 488,065, have been recently installed in several new brake systems and have, with the aid of testing shut-off cocks, proven that residual pressure diminishes internally past the conventional two-way check valve in a matter of hours, thus leaving no tension on the wheel cylinder cup lips. This is the beginning of "weeping" or outright seepage at the wheel cylinders. Thus, this simpler re-located new type of check valve that can be readily tested and replaced will forestall more serious brake failure.

The desirability of maintaining the required residual fluid pressure in the entire hydraulic system at from 8 to 12 lbs. in order to prevent air from entering the system and for other purposes, is apparent to those skilled in this art. It is therefore important that the required pressure be consistently present and particularly while the brake pedal is in its released position. It therefore follows that the described construction, aiding in the maintenance of the required fluid pressure, and acting to warn the car operator of a reduction in the residual pressure, is extremely helpful in enabling the brake system to be kept at the peak of its performance.

Having thus described an embodiment of the invention, it is obvious that the same is not to be restricted thereto, but is broad enough to cover all structures coming within the scope of the annexed claims.

What I claim is:

1. In a hydraulic brake system, a hydraulic fluid reservoir, connected by an inlet port to the master cylinder, a pressure-applying cupped piston in the master cylinder, the master cylinder having two releasing outlet ports, a valve assembly in one outlet port for brake fluid under pressure from brake shoe return springs, the master cylinder containing the pressure piston which is retracted in brake-release position, the fluid under pressure from the brake shoe return springs being exited only when the pressure piston is in said retracted position, said valve assembly containing a valve and a spring, the spring having a bias greater than hydrostatic pressure but less than the brake-shoe return spring pressure, thereby retaining a residual pressure in the master cylinder and throughout the entire brake system when the fluid pressure created by the brake shoe return springs diminishes to the bias of the valve spring to create a measureable residual pressure for determining leaks, one outlet port being located at the forward edge of the piston and in such a location that one outlet port is closed or by-passed when the piston is moved forward by relatively slight pressure on the brake pedal and the valve in the outlet port is not subjected to full brake pressure.

2. In a hydraulic brake system according to claim 1, wherein one outlet port valve assembly is replaceable through a reservoir cover or cap.

3. In a hydraulic brake system, a casing including a hydraulic fluid reservoir and a master cylinder, a spring-biased piston movable in one direction on brake pedal actuation, a valve contained within the reservoir and in communication with the cylinder, spring means for seating the valve with a predetermined pressure and permitting the unseating of the valve when fluid pressure in the cylinder exceeds that imposed by the spring means, the valve being contained in a housing, the valve being vented to permit the flow of the fluid past it and into the casing when the valve is unseated by the fluid pressure from the brake shoe return springs when piston is retracted and the housing being vented to permit the flow of the fluid out of it and into the reservoir, the casing having a compensated port establishing communication between the reservoir and the master cylinder, the housing for the valve being removably fitted therein, the valve having an extended indicating stem projecting to the outside of the housing to indicate the correct residual pressure within the casing.

4. In a hydraulic brake system, a casing including a reservoir and a master cylinder, a spring-biased piston movable in the cylinder, a removable valve housing connected into the cylinder and containing a spring-biased valve maintained in a seated position and precisely located at the forward edge of the retracted piston while the fluid pressure in the cylinder is below the pressure of the spring which biases the valve, said valve being unseated by fluid pressure when the fluid pressure in the cylinder exceeds the pressure imposed by the spring to thereby establish communication between the cylinder and the reservoir, the valve including indicating means to disclose its seated or unseated position.

References Cited

UNITED STATES PATENTS

| 1,457,156 | 5/1923 | Frock | 60—54.6 |
| 2,107,111 | 2/1938 | Etchison | 60—54.5 XR |
| 2,112,356 | 3/1938 | Bock | 60—54.6 |
| 2,332,301 | 10/1943 | Cox | 60—54.5 XR |
| 2,547,233 | 4/1951 | Seppmann | 60—54.6 |

FOREIGN PATENTS

| 872,272 | 7/1961 | Great Britain. |

MARTIN P. SCHWADRON, *Primary Examiner.*

R. R. BUNEVICH, *Assistant Examiner.*